(12) United States Patent
Dai

(10) Patent No.: US 6,480,657 B1
(45) Date of Patent: Nov. 12, 2002

(54) METHODS OF PACKAGING POLARIZATION MAINTAINING FIBERS

(75) Inventor: YuZhong Dai, Orefield, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 51 days.

(21) Appl. No.: 09/583,126

(22) Filed: May 30, 2000

(51) Int. Cl.$^7$ .................................................. G02B 6/16
(52) U.S. Cl. .................. 385/123; 385/124; 385/127; 385/125; 385/11
(58) Field of Search .................. 385/123, 124, 385/125, 127, 11; 65/403, 103, 108

(56) References Cited

U.S. PATENT DOCUMENTS

| | | | |
|---|---|---|---|
| 3,980,390 A | * 9/1976 | Yamamoto et al. | 350/96 |
| 4,529,426 A | 7/1985 | Pleibel et al. | 65/403 |
| 4,603,941 A | 8/1986 | Fujii et al. | 385/11 |
| 4,717,225 A | 1/1988 | Feth et al. | 385/11 |
| 4,773,753 A | 9/1988 | Hirose et al. | 356/35.5 |
| 5,210,814 A | * 5/1993 | McNally | 385/116 |
| 5,970,194 A | * 10/1999 | Dunn et al. | 385/95 |

OTHER PUBLICATIONS

Ephraim Suhir, "Thermally Induced Stress in an Optical Glass Fiber Soldered into a Ferrule," Journal of Lightwave Technology, vol. 12, No. 10, IEEE 1994.

* cited by examiner

Primary Examiner—Scott J. Sugarman
Assistant Examiner—M. Hasan

(57) ABSTRACT

A packaged polarization maintaining fiber includes a cylindrical polarization maintaining fiber packaged with an elliptical packaging. The elliptical packaging includes solder securing the polarization maintaining fiber within a sleeve. The optical fast and slow axes of the polarization maintaining fiber may be aligned within the packaging to reduce the effects of eccentricity on the extinction ratio of the polarization maintaining fiber. A packaged polarization maintaining fiber is also provided having a circular cross-section. The packaging materials and dimensions may be chosen such that the stress at the interface between the polarization maintaining fiber cladding and the solder is zero, thereby reducing the chance of stress induced breakages in the fiber and reducing stress induced degradation of the extinction ratio of the polarization maintaining fiber.

43 Claims, 2 Drawing Sheets

METHODS OF PACKAGING POLARIZATION MAINTAINING FIBERS

FIELD OF THE INVENTION

The present invention is related to polarization maintaining fibers, and more specifically to packaged polarization maintaining fibers and methods of packaging polarization maintaining fibers.

DESCRIPTION OF THE RELATED ART

Polarization maintaining fibers, also known as polarization preserving fibers, are used to transmit optical signals while maintaining an optical signal's polarization. The polarization maintaining fibers typically include a fiber core surrounded by a cladding having a refractive index less than the refractive index of the fiber core. A polarization maintaining fiber works to maintain the polarization of a light signal by inducing birefringence within the fiber core. The birefringence produces two optical transmission axes within the fiber, commonly known as the fast and slow axes of the fiber. The axes are orthogonal to both each other and to the propagation direction of an optical signal.

The polarization maintaining fibers typically have substantially circular cross-sections. Birefringence may be created within a polarization maintaining fiber by inducing constant stresses within the fiber with stress applying parts (stress induced birefringence). Such fibers are commonly referred to as SAP fibers. Birefringence may also be created within a polarization maintaining fiber by forming a non-circular fiber core (shape induced birefringence). The four main types of polarization maintaining fibers are the bowtie fiber, the panda fiber, the elliptical jacket fiber, and the elliptical core fiber. The slow axis of these polarization maintaining fiber exhibits a higher stress at a cladding-solder interface than the fast axis.

The quality of an optical fiber in maintaining the polarization of an optical signal may be judged by the optical fiber's extinction ratio. The larger the extinction ratio, the less an optical signal de-couples itself as it propagates along an axis of the polarization maintaining fiber. External stresses applied to a polarization maintaining fiber can degrade this extinction ratio. These stresses can occur from the packaging surrounding the optical fiber cladding. Polarization maintaining fibers are often packaged in order to help align and fix the fiber in a secure and stable manner with respect to other devices, such as a lasers.

During packaging, the body portion of the polarization maintaining fiber is typically surrounded with a solder preform and the solder preform is surrounded with a sleeve. The "body portion" of the polarization maintaining fiber is the longitudinally extending section of the polarization maintaining fiber connecting two distal ends of the polarization maintaining fiber. The solder is then melted and allowed to solidify to secure the optical fiber within the sleeve. The packaging, however, causes stresses to occur at the interface of the cladding of the polarization maintaining fiber and the solder. These stresses may cause breakages in the optical fiber core or cladding. Further, degradation of the extinction ratio may occur because, although it is currently possible to align the slow and fast axes in a predetermined manner during fabrication, it is not currently possible to precisely position a polarization maintaining fiber at the center of the packaging, i.e., the polarization maintaining fiber is typically eccentric. If a polarization maintaining fiber is positioned at the center of the packaging, the stresses on the cladding from the packaging are equal, and the packaging induced stresses have no effect on the fiberes extinction ratio, although the polarization maintaining fiber is still subject to stress induced breakage. However, a designer can not predict where a polarization maintaining fiber is ultimately positioned within a circular packaging after the solder solidifies, thereby making it impossible to align the slow and fast axes in a predetermined manner to better protect against stress induced degradation of the extinction ratio.

Therefore, there remains a need to reduce or remove the stresses occurring at the solder-cladding interface of a packaged polarization maintaining fiber. Still further, there remains a need to better orient the slow and fast optical axes of a polarization maintaining fiber within the packaging in order to better protect the polarization maintaining fiber against stress induced degradation of its extinction ratio.

SUMMARY OF THE INVENTION

The present invention is a packaged polarization maintaining fiber and method of packaging polarization maintaining fiber. A packaged polarization maintaining fiber according to the present invention includes a cylindrical polarization maintaining fiber and a sleeve surrounding a body portion of said polarization maintaining fiber. The polarization maintaining fiber is secured within the sleeve by solder. The sleeve and solder have a substantially non-circular symmetrical cross-section defined by a long axis and a short axis, and a selected one of the long or short axes has a higher stress than the other axis at an interface between the polarization maintaining fiber and the solder. The slow optical axis of the polarization maintaining fiber is substantially aligned with the selected axis and the fast optical axis of the polarization maintaining fiber is thereby substantially aligned with the other axis of the substantially non-circular symmetrical cross-section. The present invention thereby allows for a slow and fast optical axis of the polarization maintaining fiber to be oriented within the packaging to better preserve the extinction ration of the polarization maintaining fiber against stresses resulting from eccentricity. The packaging also helps reduce the magnitude of stresses induced on the fiber through eccentricity, as well as provide for higher yields during manufacturing of packaged polarization maintaining fibers.

In another embodiment of the present invention, a packaged polarization maintaining fiber includes a cylindrical polarization maintaining fiber having a circular cross-section and a sleeve surrounding the body portion of the fiber. The polarization maintaining fiber is secured within the sleeve with solder. The sleeve and solder have a substantially circular cross-section. The sleeve is comprised of a sleeve material and the solder is comprised of a solder material. The sleeve and solder material and the distance from the center of the polarization maintaining fiber to an interface between the solder and the sleeve and the distance from the center of the polarization maintaining fiber to an outer edge of the sleeve are selected such that the stress at and interface between the polarization maintaining fiber and the solder is approximately zero. This embodiment of the present invention allows for material and size selections to reduce stresses exerted on the polarization maintaining fiber, thereby reducing packaging induced stress-related breakages in the fiber and cladding surrounding the fiber. Further, lower stresses also help to preserve the extinction ratio of the polarization maintaining fiber should there be any imperfections in the packaging, such as through eccentricity. Higher yields in manufacturing polarization maintaining fibers are thereby accomplished.

DETAILED DESCRIPTION

Figure 1:
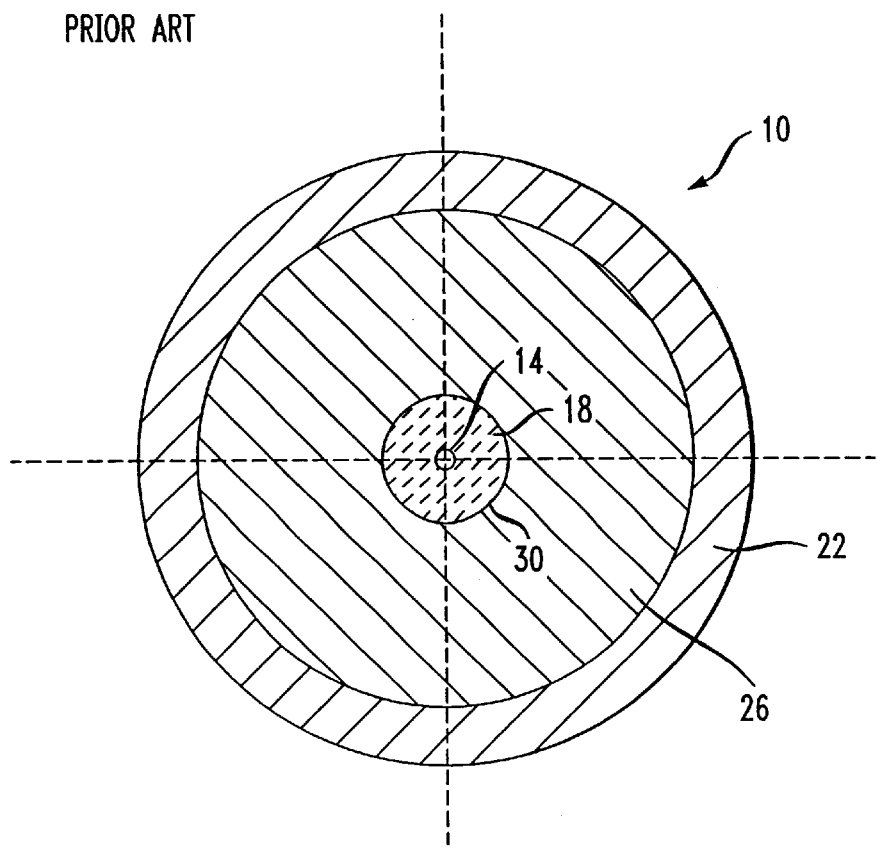
FIG. 1 is a front cross-sectional view of a prior art packaged polarization maintaining fiber.

FIG. 1 is a front cross-sectional view of a prior art packaged polarization maintaining fiber 10. The features of FIG. 1 are not drawn to scale. The packaged fiber 10 includes a cylindrical polarization maintaining fiber including fiber core 14 surrounded by cladding 18. A sleeve 22 surrounds the cylindrical body portion of the polarization maintaining fiber and is connected to solder 26. Solder 26 in turn is connected to the body portion of the polarization maintaining fiber. The solder material is typically AuSn or AgSn. The sleeve is often formed from Kovar, Invar, stainless steel, or other material. As described above, such prior art circular packaged polarization maintaining fibers do not allow for a predetermined orientation of the slow and fast axes of the polarization maintaining fiber to account for stresses present at the cladding solder interface 30 occurring when the polarization maintaining fiber is not perfectly centered in the circular cross section of the packaging.

Figure 2:
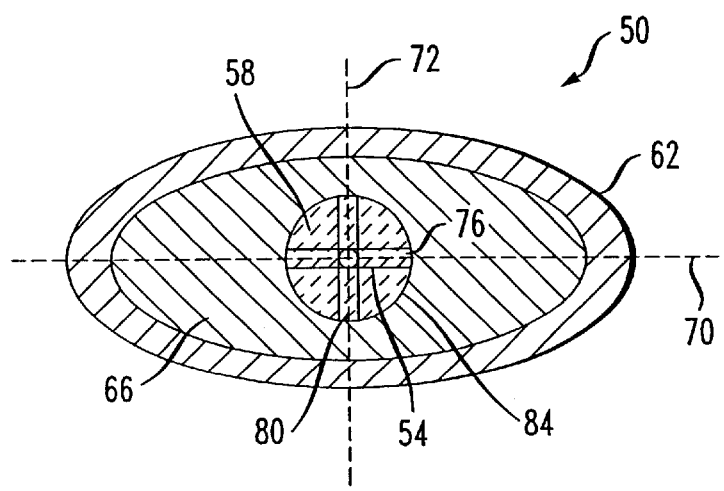
FIG. 2 is a front cross-sectional view of an exemplary packaged polarization maintaining fiber according to the present invention.

FIG. 2 is a front cross-sectional view of an exemplary packaged polarization maintaining fiber 50 according to the present invention. The features of FIG. 2 are not drawn to scale. Packaged polarization maintaining fiber 50 includes a cylindrical polarization maintaining fiber, including fiber core 54 and cladding 58 surrounding the body portion of fiber core 54. An elliptical sleeve 62 surrounds the body portion of the polarization maintaining fiber, and the polarization maintaining fiber is secured within sleeve 62 by solder 66. The sleeve 62 and solder 66 together have a substantially elliptical cross-section and form the packaging for the polarization maintaining fiber. Although the packaging of FIG. 2 is shown to have an elliptical shaped cross-section, the packaging may be any substantially non-circular symmetrical cross-section defined by a long axis 70 and a short axis 72, such as a rectangle.

The packaging shown in FIG. 2 allows a designer to orient the two principal axes 76 and 80 of the polarization maintaining fiber in a manner to reduce the effect of eccentricity on the extinction ratio of polarization maintaining fibers, thereby overcoming resulting poor yields in manufacturing packaged polarization maintaining fibers. The slow optical axis and fast optical axis of a polarization maintaining fiber may be aligned as shown in FIG. 2 as the principal axes 76 and 80. If the coefficient of thermal expansion of the solder material is greater than the coefficient of thermal expansion of the sleeve material, then the packaging induced stress at the solder-cladding interface 84 is greater along the long axis 70 than along the short axis 72. The slow optical axis, the axis exhibiting the greater stress at the cladding-fiber core interface, of a polarization maintaining fiber is then preferably aligned with the long axis 70, as shown by principal axis 76. The fast optical axis, being orthogonal to the slow optical axis, is thereby aligned with the short axis 72, as shown by principal axis 80.

In the above described scenario, the stresses induced at the solder-cladding interface 84 are favorably aligned with the intrinsic stresses that induce the birefringence in the polarization maintaining fiber. These stresses combine with the intrinsic stresses creating the slow and fast axes and which are evident at the interface of the fiber core 54 and the cladding 58. Because the stresses combine in a favorable manner at the center of the elliptical packaging, the packaged polarization maintaining fiber 50 is less susceptible to degradation of its extinction ratio when the polarization maintaining fiber is eccentrically disposed within the packaging. Differences in stress at the solder cladding interface 84 between eccentric positioning and center positioning of the polarization maintaining fiber have less of an effect on the extinction ratio of the polarization maintaining fiber because the stress changes due to eccentric positioning are only a fraction of the summed stresses at the solder-cladding interface 84 along the short and long axes 70, 72.

As an example, a polarization maintaining fiber may exhibit a stress of +6 kg/mm$^2$ along the slow axis at the cladding-fiber core interface and a stress of −4 kg/mm$^2$ along the fast axis at the cladding-fiber core interface. At the center of an elliptical packaging with the solder coefficient of thermal expansion greater than the sleeve coefficient of thermal expansion, the stress at the solder-cladding interface 84 along the long axis 70 may be −1 kg/mm$^2$ and the stress at the interface 84 along the short axis 72 may be −14 kg/mmn$^2$. If the slow axis of the polarization maintaining fiber is aligned with the long axis of the packaging and the polarization maintaining fiber is disposed at the center of the packaging, the stresses along the long axis combine to be +5 kg/mm$^2$, and the stresses along the short axis combine to be −18 kg/mm$^2$. In this manner, the stresses creating the fast and slow axis are enhanced for the fast axis and at least substantially preserved for the slow axis. Assume an external stress of magnitude +2 kg/mm$^2$ is applied through eccentricity. The stress's potential influence on the polarization maintaining fiber's extinction ration is proportional to $$\frac{2 \text{ kg/mm}^2}{\sqrt{(18 \text{ kg/mm}^2)^2 + (9 \text{ kg/mm}^2)^2}},$$

or approximately 10%. The same magnitude +2 kg/mm$^2$ stress's influence on the extinction ratio of a polarization maintaining fiber within circular packaging is proportional to $$\frac{2 \text{ kg/mm}^2}{\sqrt{(6 \text{ kg/mm}^2)^2 + (4 \text{ kg/mm}^2)^2}},$$

or approximately 28%.

With circular packaging, it is impossible to orient the slow and fast optical axes in any predetermined alignment to protect against degradation of the extinction ratio because there is no orientation to speak of when the polarization maintaining fiber is located at the center of the packaging (i.e., the stresses are all equal) and it is not possible to control the location of the polarization maintaining fiber when the solder 66 solidifies, thereby making it impossible to preselect a favorable orientation for the principal axes of the polarization maintaining fiber.

If the coefficient of thermal expansion of the sleeve material is higher than the coefficient of thermal expansion of the solder material, the stress induced at the solder cladding interface 84 is higher along the short axis 72 than along the long axis 70. In this scenario, the slow optical axis is principal axis 80 and is substantially aligned with the short axis 72. Conversely, the fast optical axis is principal axis 76 and is substantially aligned with the long axis 70.

Figure 3:
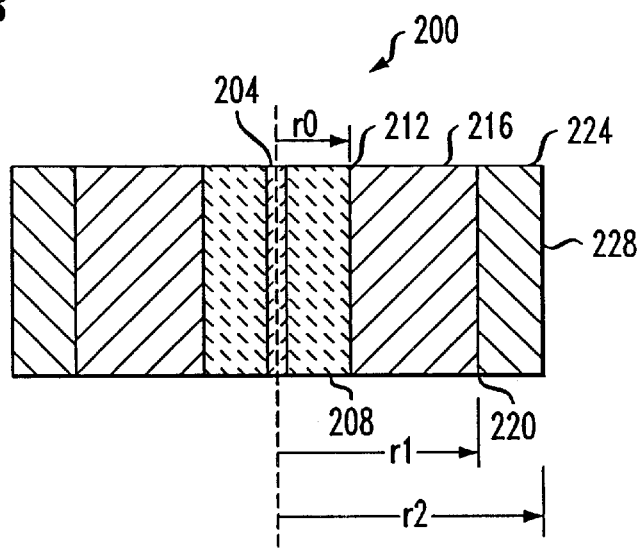
FIG. 3 is a top cross-sectional view of a packaged polarization maintaining fiber.

FIG. 3 is a top cross-sectional view of a circularly packaged polarization maintaining fiber 200. The packaged fiber 200 includes a polarization maintaining fiber, which includes fiber core 204 and cladding 208. The cladding 208 is connected to solder 216 at cladding-solder interface 212. Solder 216, in turn, is connected to sleeve 224 at solder-sleeve interface 220. The features of FIG. 3 are not drawn to scale.

The radius of the polarization maintaining fiber, i.e., the distance from the center of the fibre core 204 to the cladding-solder interface 212, is designated as r0. The distance from the center of the fiber core 204 to the solder-sleeve interface 220 is designated as r1. Also, the distance from the center of the fiber core 204 to the outer edge 228 of the sleeve 224 is designated as r2. The distances r0, r1, and r2 as used herein are assumed to be measured at 20° C., the international standard measuring temperature.

It has been shown in "Thermally Induced Stresses in an Optical Glass Fiber Soldered into a Ferrule," Ephrain Suhir, *Journal of Lightwave Technology*, Vol. 12, No. 10, October 1994, the entirety of which is incorporated herein by reference, that the stress $\sigma_o$ at a cladding-solder interface may be determined from the following equations:

$$\sigma_o = \frac{1}{D} \cdot (\delta_{12} \Delta_2 - \delta_{22} \Delta_1),$$

where $$\delta_{12} = 2 \cdot \frac{1 - v_1^2}{E_1} \cdot \frac{1}{1 - \gamma_0^2},$$

$$\delta_{22} = \left( \frac{1 + v_1}{E_1} \cdot \frac{\gamma_0^2 + 1 - 2 \cdot v_1}{1 - \gamma_0^2} + \frac{1 + v_2}{E_2} \cdot \frac{1 + (1 - 2 \cdot v_2) \cdot \gamma_1^2}{1 - \gamma_1^2} \right),$$

and $$\Delta_1 (\alpha_1 \cdot (1 + v_1) - \alpha_0 \cdot (1 + v_0)) \cdot \Delta T,$$

and $$D = \delta_{11} \cdot \delta_{22} - \delta_{12} \cdot \delta_{21}.$$

Therefore, the stress $\sigma_o$ becomes zero if $\delta_{12} \cdot \Delta_2 = \delta_{22} \cdot \Delta_1$, i.e., if $$2 \cdot \frac{1 - v_1^2}{E_1} \cdot \frac{1}{1 - \gamma_0^2} \cdot (\alpha_1 \cdot (1 + v_1) - \alpha_2 \cdot (1 + v_2)) =$$

$$\left( \frac{1 + v_1}{E_1} \cdot \frac{\gamma_0^2 + 1 - 2 \cdot v_1}{1 - \gamma_0^2} + \frac{1 + v_2}{E_2} \cdot \frac{1 + (1 - 2 \cdot v_2) \cdot \gamma_1^2}{1 - \gamma_1^2} \right) \cdot$$

$$(\alpha_1 \cdot (1 + v_1) - \alpha_0 \cdot (1 + v_0))$$

where $\alpha_0$, $\alpha_1$, and $\alpha_2$ are coefficients of thermal expansion of the polarization maintaining fiber, the solder, and the sleeve, respectively, $v_0$, $v_0$, and $v_2$ are Poisson ratios of the polarization maintaining fiber, the solder, and the sleeve, respectively, $E_0$, $E_1$, and $E_2$ are elastic moduli for the polarization maintaining fiber, the solder, and the sleeve, respectively, $\gamma_0 = r0/r1$, $\gamma_1 = r1/r2$, and $\Delta T$ is the change in temperature used to melt the solder.

Consequently, a designer may design a packaged polarization maintaining fiber with a stress at the cladding-solder interface 212 of 0 kg/mm². For example, r0 is known from the polarization maintaining fiber selected. Also the elastic modulus and Poisson ratio for the polarization maintaining fiber can be assumed to be the elastic modulus and Poisson ratio of the cladding material because the cladding is much larger than the fiber core. The diameter of the fiber core is typically around 6 um and the diameter of the cladding and fiber core together is typically around 125 um. Once the desired solder material and the desired sleeve material are chosen, then either r1 or r2 may be selected. If r1 is selected, then $\gamma_1$ is known and the above equations may be used to solve for $\gamma_2$: The value of $\gamma_2$ may be used to find the value for r2. The same process may be used to solve for r1 if r2 is selected. Conversely, r1 and r2 may be selected and $\gamma_1$ and $\gamma_2$ may be determined. Then, either the solder material or the sleeve material may be chosen, and the sleeve material or solder material, respectively, may be selected to satisfy the above equations to design for a stress of 0 kg/mm² at the solder-cladding interface.

Assume the polarization maintaining fiber of FIG. 3 is a glass fiber and r0 equals 0.0625 mm. The coefficient of thermal expansion $\alpha_0$ of the fiber is $0.5 \times 10^{-6}$/° C. and $v_0$ is 0.2. If the sleeve material is selected to be Kovar, then $\alpha_2$ is $5 \times 10^{-6}$/° C., $v_2$ is 0.32, a $E_2$ is 14000 kg/mm². If the solder material is selected to be AuSn, then $\alpha_1$ is $16 \times 10^{-6}$/° C., $v_1$, is 0.31, and $E_1$ is 6000 kg/mm². The distance r1 may be chosen to be 0.5 mm. Using the above equations, a value of 0.975 mm is calculated for r2. Thus, a value of 0.475 mm (0.975 mm–0.5 mm) is the thickness of the sleeve needed to make the stress $\alpha$ at the solder-cladding interface 220 equal to zero kg/mm².

Figure 4:
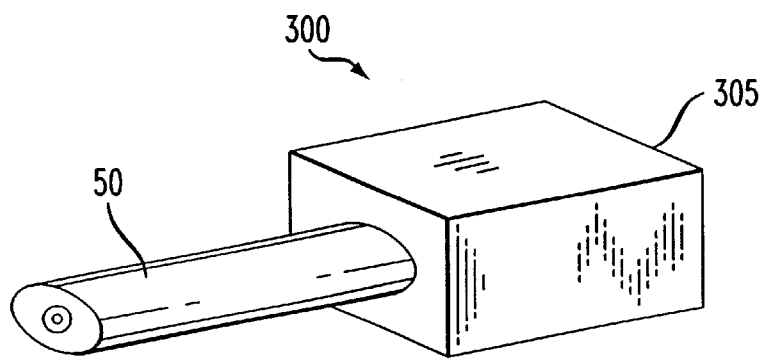
FIG. 4 is a perspective view of an optical apparatus including the packaged polarization maintaining fiber of FIG. 2.
Figure 5:
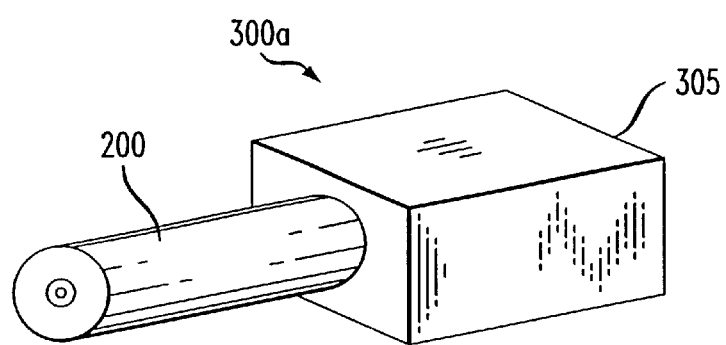
FIG. 5 is a perspective view of an optical apparatus including the packaged polarizations maintaining fiber of FIG. 3.

The packaged polarization maintaining fiber according to the present invention may be coupled to a light source, such as a laser, in order to propagate an optical signal. FIG. 4 is a perspective view of an optical apparatus 300 including packaged polarization maintaining fiber 50 of FIG. 2 coupled to a light source 305. FIG. 5 is a perspective view of an optical apparatus 300a including packaged polarization maintaining fiber 200 of FIG. 3 coupled to a light source 305.

Although the invention has been described in terms of exemplary embodiments, it is not limited thereto. Rather, the appended claims should be construed broadly to include other variants and embodiments of the invention which may be made by those skilled in the art without departing from the scope and range of equivalents of the invention.

What is claimed is:

1. A packaged polarization maintaining fiber, comprising:
a cylindrical polarization maintaining fiber having a substantially circular cross-section, a first end distal from a second end, said first and second ends connected by a body portion; and a sleeve surrounding said body portion, said body portion secured within said sleeve by solder, said sleeve and solder having a substantially non-circular symmetrical cross-section defined by a long axis and a short axis, a selected one of said long or short axes having a higher stress than said other axis at an interface between said polarization maintaining fiber and said solder, a slow optical axis of said polarization maintaining fiber being substantially aligned with said selected axis and a fast optical axis of said polarization maintaining fiber being substantially aligned with said other axis of said substantially non-circular symmetrical cross-section.

2. The packaged polarization maintaining fiber of claim 1, wherein said sleeve is comprised of a sleeve material having a coefficient of thermal expansion and said solder is comprised of a solder material having a coefficient of thermal expansion, said coefficient of thermal expansion of said solder being greater than said coefficient of thermal expansion of said sleeve.

3. The packaged polarization maintaining fiber of claim 2, wherein said sleeve and solder have a substantially elliptical cross-section and said selected axis is said long axis.

4. The packaged polarization maintaining fiber of claim 2, wherein said sleeve and solder have a substantially rectangular cross-section and said selected axis is said long axis.

5. The packaged polarization maintaining fiber of claim 1, wherein said sleeve is comprised of a sleeve material having a coefficient of thermal expansion and said solder is comprised of a solder material having a coefficient of thermal expansion, said coefficient of thermal expansion of said sleeve being greater than said coefficient of thermal expansion of said solder.

6. The packaged polarization maintaining fiber of claim 5, wherein said sleeve and solder have a substantially elliptical cross-section and said selected axis is said short axis.

7. The packaged polarization maintaining fiber of claim 5, wherein said sleeve and solder have a substantially rectangular cross-section and said selected axis is said short axis.

8. The packaged polarization maintaining fiber of claim 1, wherein said cylindrical polarization maintaining fiber comprises a core, said core defined by a first end, a second end distal from said first end, and a body portion connecting said first and second ends, and a cladding surrounding said body portion of said core.

9. The packaged polarization maintaining fiber of claim 8, wherein said polarization maintaining fiber is a bowtie fiber, a panda fiber, an elliptical jacket fiber, or an elliptical core fiber.

10. The packaged polarization maintaining fiber of claim 8, wherein said polarization maintaining fiber is a shape induced birefringence fiber or a SAP fiber.

11. The packaged polarization maintaining fiber of claim 1, wherein said solder is AuSn and said sleeve is Kovar.

12. A method of packaging a polarization maintaining fiber, comprising:
providing a cylindrical polarization maintaining fiber, said cylindrical polarization maintaining fiber having a substantially circular cross-section, a first end distal from a second end, said first and second ends connected by a body portion;
surrounding said body portion with a sleeve;
securing said body portion within said sleeve with solder, said solder and sleeve having a substantially non-circular symmetrical cross-section defined by a long axis and a short axis, a selected one of said long or short axes having a higher stress than said other axis at an interface between said polarization maintaining fiber and said solder; and
substantially aligning a slow optical axis of said polarization maintaining fiber with said selected axis and a fast optical axis of said polarization maintaining fiber with said other axis of said substantially non-circular symmetrical cross-section.

13. The method of claim 12, wherein said step of securing said body portion within said sleeve with solder includes the step of melting a solder preform to form molten solder and cooling said molten solder to solidify said solder and secure said body portion within said sleeve.

14. The method claim 12, wherein said cylindrical polarization maintaining fiber comprises a core, said core defined by a first end, a second end distal from said first end, and a body portion connecting said first and second ends, and a cladding surrounding said body portion of said core.

15. The method of claim 14, wherein said polarization maintaining fiber is a SAP fiber or a shape induced birefringence fiber.

16. The method of claim 14, wherein said polarization maintaining fiber is a bowtie fiber, a panda fiber, an elliptical jacket fiber, or an elliptical core fiber.

17. The method of claim 12, wherein said sleeve is comprised of a sleeve material having a coefficient of thermal expansion and said solder is comprised of a solder material having a coefficient of thermal expansion, said coefficient of thermal expansion of said solder being greater than said coefficient of thermal expansion of said sleeve.

18. The method of claim 17, wherein said sleeve and solder have a substantially elliptical cross-section and said selected axis is said long axis.

19. The method of claim 17, wherein said sleeve and solder have a substantially rectangular cross-section and said selected axis is said long axis.

20. The method of claim 12, wherein said sleeve is comprised of a sleeve material having a coefficient of thermal expansion and said solder is comprised of a solder material having a coefficient of thermal expansion, said coefficient of thermal expansion of said sleeve being greater than said coefficient of thermal expansion of said solder.

21. The method of claim 20, wherein said sleeve and solder have a substantially elliptical cross-section and said selected axis is said short axis.

22. The method of claim 20, wherein said sleeve and solder have a substantially rectangular cross-section and said selected axis is said short axis.

23. A packaged polarization maintaining fiber, comprising:
a cylindrical polarization maintaining fiber having a substantially circular cross-section, a first end distal from a second end, said first and second ends connected by a body portion; and
a sleeve surrounding said body portion, said body portion secured within said sleeve with solder, said sleeve and solder having a substantially circular cross-section, said sleeve comprised of a sleeve material and said solder comprised of a solder material,
wherein said sleeve material and said solder material and the distance from the center of said polarization maintaining fiber to an interface between said solder and said sleeve and the distance from the center of said polarization maintaining fiber to an outer edge of said sleeve are selected such that stress at an interface between said polarization maintaining fiber and said solder is approximately zero.

24. The packaged polarization maintaining fiber of claim 23, wherein said packaged polarization maintaining fiber conforms to the following equation:

$$2 \cdot \frac{1-v_1^2}{E_1} \cdot \frac{1}{1-\gamma_0^2} \cdot (\alpha_1 \cdot (1+v_1) - \alpha_2 \cdot (1+v_2)) =$$
$$\left( \frac{1+v_1}{E_1} \cdot \frac{\gamma_0^2 + 1 - 2 \cdot v_1}{1-\gamma_0^2} + \frac{1+v_2}{E_2} \cdot \frac{1+(1-2 \cdot v_2) \cdot \gamma_1^2}{1-\gamma_1^2} \right) \cdot$$
$$(\alpha_1 \cdot (1+v_1) - \alpha_0 \cdot (1+v_0))$$

wherein $\alpha_0$, $\alpha_1$, and $\alpha_2$ are coefficients of thermal expansion of said polarization maintaining fiber, said solder, and said sleeve, respectively, $v_0$, $v_1$, and $v_2$ are Poisson ratios of said polarization maintaining fiber, said solder, and said sleeve, respectively, $E_0$, $E_1$, and $E_2$ are elastic moduli for said polarization maintaining fiber, said solder, and said sleeve, respectively, $\gamma_0 = r0/r1$, and $\gamma_1 = r1/r2$, where r0 is the radius of said polarization maintaining fiber, r1 is the distance from said center of said polarization maintaining fiber to said interface between said solder and said sleeve, and r2 is the distance from said center of said polarization maintaining fiber to said outer edge of said sleeve.

25. The packaged polarization maintaining fiber of claim 24, wherein said sleeve is Kovar and said solder is AuSn.

26. A method of packaging a polarization maintaining fiber, comprising:
providing a cylindrical polarization maintaining fiber, said cylindrical polarization maintaining fiber having a substantially circular cross-section, a first end distal from a second end, said first and second ends connected by a body portion;
surrounding said body portion with a sleeve;
securing said body portion within said sleeve with solder, said solder and sleeve having a substantially circular cross-section, said sleeve comprised of a sleeve material and said solder comprised of a solder material, said sleeve material and said solder material and the distance from the center of said polarization maintaining fiber to an interface between said solder and said sleeve and the distance from the center of said polarization maintaining fiber to an outer edge of said sleeve selected such that stress at an interface between said polarization maintaining fiber and said solder is approximately zero.

27. The method of claim 26, further comprising the step of selecting said materials and said distance from said center of said polarization maintaining fiber to said outer edge of said sleeve, and then determining said distance from said center of said polarization maintaining fiber to said interface between said sleeve and said solder.

28. The method of claim 26, further comprising the step of selecting said materials and said distance from said center of said polarization maintaining fiber to said interface between said sleeve and said solder, and then determining said distance from said center of said polarization maintaining fiber to said outer edge of said sleeve.

29. The method of claim 26, further comprising the step of selecting said distance from said center of said polarization maintaining fiber to said outer edge of said sleeve and said distance from said center of said polarization maintaining fiber to said interface between said sleeve and said solder, and then selecting said materials.

30. The method of claim 29, wherein said step of selecting said materials includes the steps of selecting said solder material and then determining said sleeve material.

31. The method of claim 29, wherein said step of selecting said materials includes the steps of selecting said sleeve material and then determining said solder material.

32. The method of claim 26, wherein said packaged polarization maintaining fiber conforms to the following equation:

$$2 \cdot \frac{1-v_1^2}{E_1} \cdot \frac{1}{1-\gamma_0^2} \cdot (\alpha_1 \cdot (1+v_1) - \alpha_2 \cdot (1+v_2)) =$$
$$\left( \frac{1+v_1}{E_1} \cdot \frac{\gamma_0^2 + 1 - 2 \cdot v_1}{1-\gamma_0^2} + \frac{1+v_2}{E_2} \cdot \frac{1+(1-2 \cdot v_2) \cdot \gamma_1^2}{1-\gamma_1^2} \right) \cdot$$
$$(\alpha_1 \cdot (1+v_1) - \alpha_0 \cdot (1+v_0))$$

wherein $\alpha_0$, $\alpha_1$, and $\alpha_2$ are coefficients of thermal expansion of said polarization maintaining fiber, said solder, and said sleeve, respectively, $v_0$, $v_1$, and $v_2$ are Poisson ratios of said polarization maintaining fiber, said solder, and said sleeve, respectively, $E_0$, $E_1$, and $E_2$ are elastic moduli for said polarization maintaining fiber, said solder, and said sleeve, respectively, $\gamma_0 = r0/r1$, and $\gamma_1 = r1/r2$, where r0 is the radius of said polarization maintaining fiber, r1 is the distance from said center of said polarization maintaining fiber to said interface between said solder and said sleeve, and r2 is the distance from said center of said polarization maintaining fiber to said outer edge of said sleeve.

33. An optical apparatus, comprising:
a light source; and
a packaged polarization maintaining fiber coupled to said light source, said packaged polarization maintaining fiber comprising:
a cylindrical polarization maintaining fiber having a substantially circular cross-section, a first end distal from a second end, said first and second ends connected by a body portion; and
a sleeve surrounding said body portion, said body portion secured within said sleeve by solder, said sleeve and solder having a substantially non-circular symmetrical cross-section defined by a long axis and a short axis, a selected one of said long or short axes having a higher stress than said other axis at an interface between said polarization maintaining fiber and said solder, a slow optical axis of said polarization maintaining fiber being substantially aligned with said selected axis and a fast optical axis of said polarization maintaining fiber being substantially aligned with said other axis of said substantially non-circular symmetrical cross-section.

34. The optical apparatus of claim 33, wherein said sleeve is comprised of a sleeve material having a coefficient of thermal expansion and said solder is comprised of a solder material having a coefficient of thermal expansion, said coefficient of thermal expansion of said solder being greater than said coefficient of thermal expansion of said sleeve.

35. The optical apparatus of claim 34, wherein said sleeve and solder have a substantially elliptical cross-section and said selected axis is said long axis.

36. The optical apparatus of claim 34, wherein said sleeve and solder have a substantially rectangular cross-section and said selected axis is said long axis.

37. The optical apparatus of claim 33, wherein said sleeve is comprised of a sleeve material having a coefficient of thermal expansion and said solder is comprised of a solder material having a coefficient of thermal expansion, said coefficient of thermal expansion of said sleeve being greater than said coefficient of thermal expansion of said solder.

38. The optical apparatus of claim 37, wherein said sleeve and solder have a substantially elliptical cross-section and said selected axis is said short axis.

39. The optical apparatus of claim 37, wherein said sleeve and solder have a substantially rectangular cross-section and said selected axis is said short axis.

40. The optical apparatus of claim 33, wherein said light source is a laser.

41. An optical apparatus, comprising:

a light source; and a packaged polarization maintaining fiber, said packaged polarization maintaining fiber comprising:

a cylindrical polarization maintaining fiber having a substantially circular cross-section, a first end distal from a second end, said first and second ends connected by a body portion; and a sleeve surrounding said body portion, said body portion secured within said sleeve with solder, said sleeve and solder having a substantially circular cross-section, said sleeve comprised of a sleeve material and said solder comprised of a solder material, wherein said sleeve material and said solder material and the distance from the center of said polarization maintaining fiber to an interface between said solder and said sleeve and the distance from the center of said polarization maintaining fiber to an outer edge of said sleeve are selected such that stress at an interface between said polarization maintaining fiber and said solder is approximately zero.

42. The optical apparatus of claim 41, wherein said packaged polarization maintaining fiber conforms to the following equation:

$$2 \cdot \frac{1-v_1^2}{E_1} \cdot \frac{1}{1-\gamma_0^2} \cdot (\alpha_1 \cdot (1+v_1) - \alpha_2 \cdot (1+v_2)) =$$

$$\left( \frac{1+v_1}{E_1} \cdot \frac{\gamma_0^2 + 1 - 2 \cdot v_1}{1-\gamma_0^2} + \frac{1+v_2}{E_2} \cdot \frac{1+(1-2 \cdot v_2) \cdot \gamma_1^2}{1-\gamma_1^2} \right) \cdot$$

$$(\alpha_1 \cdot (1+v_1) - \alpha_0 \cdot (1+v_0))$$

wherein $\alpha_0$, $\alpha_1$, and $\alpha_2$ are coefficients of thermal expansion of said polarization maintaining fiber, said solder, and said sleeve, respectively, $v_0$, $v_1$, and $v_2$ are Poisson ratios of said polarization maintaining fiber, said solder, and said sleeve, respectively, $E_0$, $E_1$, and $E_2$ are elastic moduli for said polarization maintaining fiber, said solder, and said sleeve, respectively, $\gamma_0$=r0/r1, and $\gamma_1$=r1/r2, where r0 is the radius of said polarization maintaining fiber, r1 is the distance from said center of said polarization maintaining fiber to said interface between said solder and said sleeve, and r2 is the distance from said center of said polarization maintaining fiber to said outer edge of said sleeve.

43. The optical apparatus of claim 41, wherein said light source is a laser.

* * * * *